H. A. LAUHOFF.
CEREAL CAKE OR BODY.
APPLICATION FILED FEB. 16, 1907.
903,586.
Patented Nov. 10, 1908.
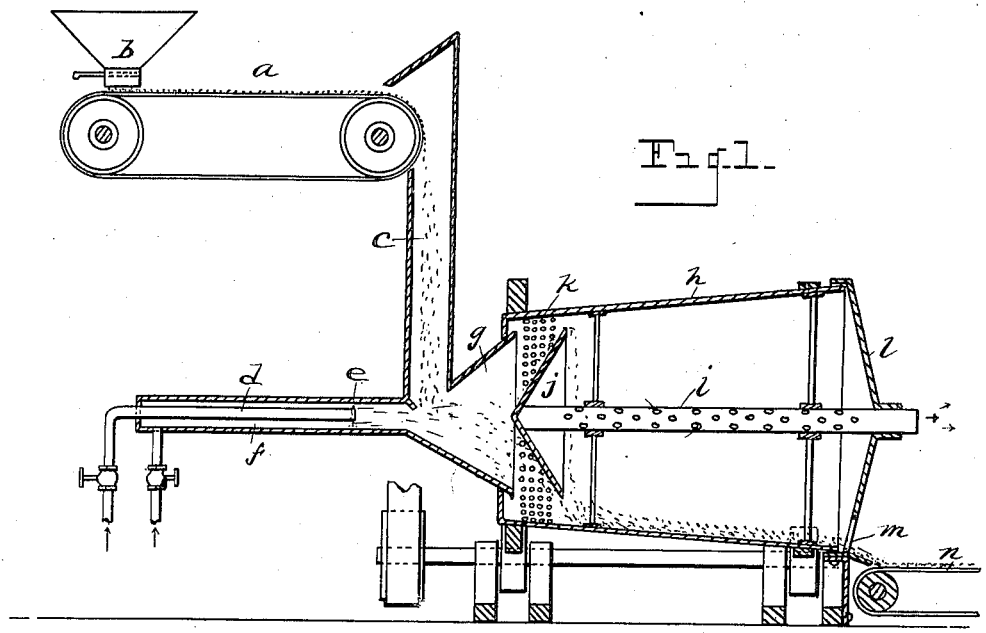
Fig. 1.
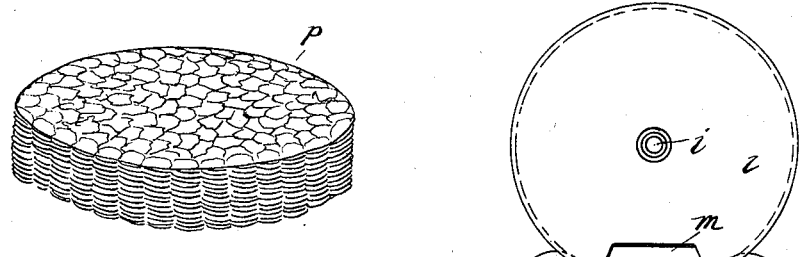
Fig. 4.
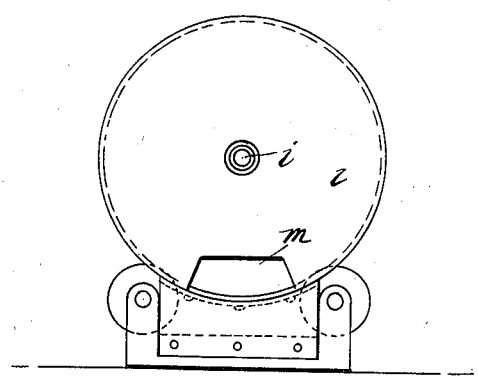
Fig. 2.
Fig. 3.
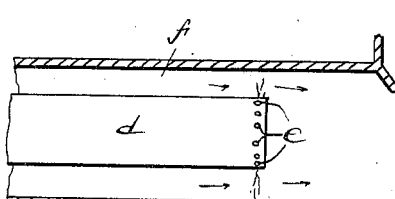
WITNESSES
O. B. Baenziger
C. M. Spielberg
INVENTOR
Henry A. Lauhoff
Newell S. Wright
By ____ his Attorney.

UNITED STATES PATENT OFFICE.

HENRY A. LAUHOFF, OF DETROIT, MICHIGAN.

CEREAL CAKE OR BODY.

No. 903,586.　　　　Specification of Letters Patent.　　　Patented Nov. 10, 1908.

Application filed February 16, 1907. Serial No. 357,713.

*To all whom it may concern:*

Be it known that I, HENRY A. LAUHOFF, a citizen of the United States, residing at Detroit, in the county of Wayne and State of Michigan, have invented certain new and useful Improvements in Cereal Cakes or Bodies, of which the following is a specification.

My invention is designed to provide a cereal cake or mass as an article of manufacture for a superior food product, and also the process of forming the same, as hereinafter more fully described and claimed and illustrated in the accompanying drawings, in which, Figure 1 is a view in vertical longitudinal section illustrating a suitable apparatus which may be employed in the manufacture of said article. Fig. 2 is an end elevation thereof. Fig. 3 is an enlarged view in section showing parts of the apparatus. Fig. 4 is a view in perspective illustrating one of my improved cereal bodies or mass.

The cereal flakes employed in making my improved article of manufacture are preferably flakes made from cereal grits or granules subjected to a proper process whereby the said grits or granules are drawn and compressed into a thin film.

I do not limit myself to any particular manner of forming the flakes themselves, but I contemplate as coming within the scope of my invention employing cereal flakes such, for example, as are embodied in United States Letters Patent granted April 28, 1891 No. 451,059, said patent describing the formation of rice flakes for example. Similar flakes, however, made of corn or other cereals may be employed within the scope of my invention. These flakes may be formed by suitable rollers (not shown).

My invention contemplates slightly moistening the exterior surfaces of the thin flakes with a water vapor or mist, the water being very finely atomized by a suitable means, the flakes being subjected to the mist or vapor just sufficient to slightly moisten the exterior surfaces thereof without dissolving or saturating the flakes and without danger of the thin flakes absorbing the moisture, inasmuch as such absorption or saturation would reduce the flakes to a mush. At the same time the flakes are being thus subjected to the mist or vapor they are rapidly agitated, the flakes being rapidly stirred or agitated as a flocculent mass and moved forward or away from the reach of the spray. After the external surfaces of the flakes have been thus moistened they are subjected to a very slight degree of compression by any suitable means to form the flakes into a mass or cake. The exterior surfaces of the flakes are only sufficiently moistened to cause the flakes to slightly adhere so that they may be slightly compressed and stuck or held together in any desired form. My invention contemplates, furthermore, after thus slightly compressing the flakes into a desired form again slightly moistening the exterior surface of the mass so formed and subjecting the mass so moistened on its exterior to a toasting process, the exterior moistened surface of the mass when toasted forming a firm exterior surface or crust sufficient to enable the mass to hold together in handling.

While I do not limit myself to any particular apparatus for carrying out my improved process, yet I have shown in the drawings an apparatus adapted for this purpose in which a carrier belt is shown at $a$ upon which the flakes are fed, as for example, through the feeding chute $b$, the flakes falling through a vertical passage way $c$ into the base of which is led a suitable vapor blast. As shown a water pipe is indicated at $d$ perforated at its inner end as indicated at $e$, an air blast being admitted into a surrounding pipe $f$ opening into the base of the passage $c$. It will be observed that the water is atomized or vaporized, the water and air both being under suitable pressure so that as the flakes fall to the base of the passage $c$ they will be struck with the finely atomized vapor blast and carried forward, as through a funnel shaped projection $g$ into a rotatable cylinder $h$ within which is a perforated pipe $i$ carrying a conical disk $j$, against which the flakes strike, the flakes being diverted to the periphery of the disk. The inner end of the cylinder is preferably perforated as indicated at $k$ for the escape of the vapor blast, the pipe $i$ being also perforated for the same purpose, as it is desirable to permit the escape of the vapor blast immediately upon the entrance of the flakes into the cylinder to prevent their becoming too much moistened. The outer end of the cylinder is open, a stationary cap or shield *l* being located thereabout formed with a discharge opening indicated at *m* through which the moistened flakes may be discharged as upon a carrier belt, by which means they may be carried to suitable compressing mechanism to slightly press the moistened flakes into a mass of desired form, the compressing apparatus not being shown. One of my improved cakes or masses is indicated in Fig. 4 at *p*.

It will readily be seen that the moisture must not be applied to the thin cereal flakes in a liquid form, but the moisture must be in the form of a very finely atomized spray or vapor, or mist, any suitable atomizer being employed for this purpose. The moistening of the flakes, care being taken to prevent the flakes from dissolving, will cause the flakes to readily stick together when compressed. Only sufficient compression being employed to hold the flakes together, it will be evident that the cakes are open and porous. The cylinder *h*, it will be understood, is in rapid motion while the vapor blast is being discharged therefrom, the revolution of the cylinder of course giving continuous motion to the flakes and causing their rapid discharge.

In spraying the exterior surface of the mass after the flakes are compressed, it is desirable to sufficiently spray the same to slightly dissolve the exterior surface of the mass so that when subjected to a toasting process it will form a crust. It will be obvious that by thus moistening the exterior surface of the mass, a hardened exterior surface or crust will be formed simply by drying the mass, even were it not toasted. I would have it understood also that the flakes might be formed at the outset in a sufficiently moist condition when they come from the compressing rolls to enable them to be pressed into a mass and adhere together under compression, the slightly compressed mass being moistened on its exterior surface in order to form an exterior crust upon the surface of the mass to hold the slightly compressed flakes together.

What I claim as my invention is:

1. The process of forming a cereal mass containing cereal films or flakes, comprising agitating the flakes and spraying the exterior surfaces of the flakes with a mist or vapor to slightly moisten the exterior surfaces of the flakes while the flakes are agitated into a loose flocculent mass without dissolving or saturating the same, and then slightly compressing the moistened flakes into desired form.

2. The process of forming a cereal mass containing cereal films or flakes, comprising agitating the flakes, moving the same forward, and subjecting the flakes to a finely atomized vapor blast to slightly moisten the exterior surfaces of the flakes while the flakes are agitated into a loose flocculent mass and moved forward, and then slightly compressing the flakes into a mass of desired form.

3. The process of forming a cereal mass containing cereal films or flakes consisting of moving forward the flakes and subjecting the flakes to a finely atomized vapor blast applied to the exterior surfaces thereof, while the flakes are agitated into a loose flocculent mass, then slightly compressing the exteriorly moistened flakes into a mass of desired form, then slightly moistening the exterior surface of the compressed mass and subjecting the mass to a toasting process thereby forming a crust on the exterior surface thereof.

4. The process of forming a cereal mass containing cereal films or flakes consisting of moving forward the flakes and subjecting the flakes to a finely atomized vapor blast to moisten the exterior surfaces of the flakes while the flakes are agitated into a loose flocculent mass, then slightly compressing the exteriorly moistened flakes into a mass of desired form, then slightly moistening the exterior surface of the compressed mass and forming upon said surface a crust to hold the slightly compressed flakes together.

5. The process of forming a cereal mass from thin cereal films or flakes consisting, first, of slightly compressing the flakes into a mass of desired form, second, moistening the exterior surface of the mass after the slight compression thereof to slightly dissolve the flakes upon the exterior surface of the mass, and third, drying the slightly dissolved flakes on the exterior surface of the mass and forming upon said surface an exterior crust to hold the inner flakes of the mass together.

6. The process of forming a cereal mass containing thin cereal films or flakes consisting, first, of slightly compressing moist films or flakes into a mass of desired form, second, moistening the exterior surface of the mass after the slight compression thereof to slightly dissolve the flakes upon the exterior surface of the mass, and, third, then subjecting the mass to a toasting process whereby the slightly dissolved flakes upon the exterior surface of said mass are formed into a crust to hold the inner flakes together.

7. As an article of manufacture a cereal mass formed of thin cereal films or flakes but slightly compressed having an exterior crust of slightly dissolved exterior flakes formed upon the surface of the mass to hold the inner flakes of the mass together.

8. As an article of manufacture a cereal mass formed of thin cereal films or flakes but slightly compressed having an exterior crust of slightly dissolved exterior flakes toasted on the exterior surface of the mass to hold the inner flakes of the mass together.

9. As an article of manufacture a cereal mass formed of thin cereal films or flakes but slightly compressed, said mass having an exterior crust formed of slightly dissolved and dried exterior flakes, said crust holding the interior flakes of the mass together.

In testimony whereof I affix my signature in presence of two witnesses.

HENRY A. LAUHOFF.

Witnesses:
N. S. WRIGHT,
E. M. SPIELBRUG.